United States Patent
Yamabuki et al.

(10) Patent No.: US 7,207,634 B2
(45) Date of Patent: Apr. 24, 2007

(54) LASER-WELDED ASSEMBLY

(75) Inventors: Fumiyasu Yamabuki, Nishikamo-gun (JP); Hideo Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/503,364

(22) PCT Filed: Feb. 21, 2003

(86) PCT No.: PCT/JP03/01957

§ 371 (c)(1),
(2), (4) Date: Aug. 3, 2004

(87) PCT Pub. No.: WO03/078138

PCT Pub. Date: Sep. 29, 2003

(65) Prior Publication Data

US 2005/0082265 A1 Apr. 21, 2005

(30) Foreign Application Priority Data

Mar. 18, 2002 (JP) ............................. 2002-074648

(51) Int. Cl.
*B60T 8/36* (2006.01)
(52) U.S. Cl. .................................. 303/119.3
(58) Field of Classification Search ............ 303/119.1, 303/119.2, 119.3
See application file for complete search history.

(56) References Cited

U.S. PATENT DOCUMENTS

| | | | |
|---|---|---|---|
| 5,276,303 A | 1/1994 | Bergmann | |
| 5,893,959 A | 4/1999 | Muellich | |
| 6,354,674 B1* | 3/2002 | Iwamoto et al. | 303/119.3 |
| 2002/0032988 A1* | 3/2002 | Lange et al. | 51/309 |
| 2002/0179234 A1 | 12/2002 | Platz | |
| 2003/0118902 A1* | 6/2003 | Schubert et al. | 429/174 |

FOREIGN PATENT DOCUMENTS

| | | |
|---|---|---|
| GB | 2 276 584 A | 10/1994 |
| JP | A-62-033624 | 2/1987 |
| JP | A-06-218567 | 8/1994 |
| JP | A 8-247324 | 9/1996 |
| JP | A 8-261349 | 10/1996 |
| JP | A 9-260820 | 10/1997 |
| JP | A 9-510930 | 11/1997 |
| JP | A 11-170371 | 6/1999 |
| JP | A-11-348132 | 12/1999 |

(Continued)

*Primary Examiner*—Devon Kramer
(74) *Attorney, Agent, or Firm*—Oliff & Berridge, PLC.

(57) ABSTRACT

A metal member and a resin member, or two resin members are welded or bonded to each other at welding or bonding surfaces thereof which are heated by irradiation of a laser beam, thereby providing an assembly wherein the two members are fluid-tightly bonded at the bonding surfaces. The laser beam is transmitted through a laser transmitting resin, and a laser absorbing material which is in contact with the laser transmitting resin is irradiated with the laser beam, so that the laser absorbing material is heated, whereby the laser transmitting resin and the laser absorbing resin are melted owing to the heat. By moving the spot of the laser beam, portions of the resin members to be heated and melted displace, and the resin materials are melted and then solidify.

28 Claims, 5 Drawing Sheets

FOREIGN PATENT DOCUMENTS

| | | | |
|---|---|---|---|
| JP | A 2000-218698 | | 8/2000 |
| JP | A 2000-264192 | | 9/2000 |
| JP | 2001084973 | * | 3/2001 |
| JP | A 2001-105499 | | 4/2001 |
| JP | A 2001-105500 | | 4/2001 |
| JP | 2001232687 | * | 8/2001 |
| JP | A 2001-232687 | | 8/2001 |
| JP | A 2002-18961 | | 1/2002 |
| JP | A-2002-067165 | | 3/2002 |
| JP | 2002248688 | * | 9/2002 |
| JP | A-2003-1455 | | 1/2003 |
| WO | WO 01/28744 A1 | | 4/2001 |

* cited by examiner

LASER-WELDED ASSEMBLY

TECHNICAL FIELD

The present invention relates to an assembly which includes a base body, a functional component(s) provided on one side of the base body, and an enclosing member fixed to a surface of the base body located on the above-indicated one side of the base body, such that the enclosing member encloses the functional component(s), or an assembly which includes a base body, a first member fixed to one surface of the base body, and a second member fixed to the first member. The invention also relates to a method of producing such assemblies.

BACKGROUND ART

One example of such assemblies includes a hydraulic pressure control device for a hydraulically operated brake system for a vehicle. The hydraulic pressure control device generally includes a plurality of solenoid-operated valves. The plurality of solenoid-operated valves are collectively disposed on one base body wherein there are formed fluid passages through which the solenoid-operated valves are connected to each other or the solenoid-operated valves are connected to other components. In this case, as disclosed in JP-A-2000-264192, the plurality of solenoid-operated valves are collectively disposed on one side of the base body, and a cover is fixed to a surface of the base body located on the side of the base body, such that the cover encloses the solenoid-operated valves. Such a hydraulic pressure control device is one example of the assembly according to the present invention.

In the hydraulic pressure control device described above, the base body is generally formed of a metal while the cover is generally formed of a synthetic resin material, from the standpoint of ease of workability, required mechanical strength, etc. The cover is fixed to the base body by a plurality of bolts. In the conventional arrangement, however, it is necessary to form internally threaded holes and through-holes for the bolts in the base body and the cover, respectively, taking a lot of labor in processing. Further, the number of components is undesirably increased, taking a lot of labor in inventory control and fabricating or assembling. Where a seal member is interposed between the cover and the base body for maintaining the fluid-tightness at the fixed portions of the base body and the cover, this results in a lot of labor in the above-described processing, inventory control and fabricating or assembling.

While the above-described explanation is made with respect to the hydraulic pressure control device for the hydraulically operated brake system for the vehicle, problems similar to those indicated above are found in other devices having a structure similar to that of the hydraulic pressure control device, such as a fluid control device of a suspension of the vehicle.

In the above-described hydraulic pressure control device, a housing is provided by a structure in which the base body and the enclosing member are fixed to each other. In this respect, it is considered that the housing is an assembly including a base body and a second member. Further, in the above-described hydraulic pressure control device, the cover is constituted by a hollow member and a closure member which closes one opening of the hollow member. In this respect, it is considered that the housing is an assembly including a base body, a first member, and a second member. These assemblies suffer from problems similar to those described above.

DISCLOSURE OF THE INVENTION

The present invention was made in the background art described above. It is therefore an object of the invention to reduce a cost of manufacture of an assembly which includes a base body, a functional component(s) provided on one side of the base body, and an enclosing member fixed to a surface of the base body located on the above-indicated one side of the base body, such that the enclosing member encloses the functional component(s), and an assembly which includes a base body, a first member fixed to one surface of the base body, and a second member fixed to the first member. The present invention provides assemblies and methods of producing the same according to the following modes. Each of the modes is numbered like claims and depends from the other mode or modes, as needed, for easier understanding of the present invention. It is to be understood that the present invention is not limited to the technical features or any combinations thereof disclosed in the present specification. It is to be further understood that a plurality of elements or features included in any one of the following modes of the invention are not necessarily provided all together, and that the invention may be embodied with selected one or ones of the elements or features described with respect to the same mode.

(1) An assembly comprising a base body, at least one functional component which is provided on one side of the base body, and an enclosing member which is fixed to a surface of the base body located on the above-indicated one side of the base body, such that the enclosing member encloses the at least one functional component, wherein the enclosing member is formed of a laser transmitting material and the base body is formed of a laser non-transmitting material, at least one of the base body and the enclosing member being formed of a thermoplastic resin, the base body and the enclosing member being welded to each other.

Where the enclosing member is formed of the laser transmitting material and the base body is formed of the laser non-transmitting material, the base body is irradiated with a laser beam which is transmitted through the enclosing member. Since the base body is formed of the laser non-transmitting material, heat is generated at a portion of the base body which is irradiated with the laser beam. The generated heat propagates to other portions of the base body from the laser-irradiated portion thereof and to the enclosing member. Accordingly, if at least one of the base body and the enclosing member is formed of the thermoplastic resin, a portion of the above-indicated at least one of the base body and the enclosing member is melted or fused, so that the above-indicated at least one of the base body and the enclosing member is bonded or welded to the other of the base body and the enclosing member. Therefore, the enclosing member can be easily fixed to the base body, thereby reducing the cost of manufacture of the assembly.

The assembly provided by welding operations conducted such that bonded portions of the base body and the enclosing member are fluid-tightly bonded is used, for instance, as a body assembly of a hydraulic pressure control device for a vehicle brake system or a fluid control device such as a vehicle height adjusting device of a vehicle suspension, or as a box-like body for accommodating a printed circuit board of an electronic control device. The above-described assembly is also applicable to a structure in which the thermoplastic resin can be used, such as a box-like body used in vehicle interior components such as an audio system and a navigation system of the vehicle.

Where the thermoplastic resin can be used, the assembly may be used as a box-like body used in household appliances (such as televisions, videos, TV-game machines, toys, air conditioners, telephones, facsimile machines, cellular phones), control apparatuses for machine tools, and office automation (OA) machines (such as personal computers), for instance. Further, the assembly may be used as a box-like body for accommodating some of functional components and devices of those described above.

Each of the at least one functional component may be disposed on the above-indicated surface of the base body, or at least a part of the functional component may be accommodated in a recess formed in the above-indicated surface of the base body. The functional component may be attached to a protrusion formed on the surface of the base body, or may be attached to the base body via a fixing member fixed to the surface of the base body. Further, the functional component may be attached to the enclosing member. In this case, the functional component is attached to the base body via the enclosing member.

Examples of the functional component are electronic control devices, sensors, solenoid-operated valves, actuators such as motors, mechanical structures, structure-reinforcing components in box-like bodies.

(2) The assembly according to the above mode (1), wherein the base body is formed of a metal.

The base body may be formed of materials other than the metal. For instance, the base body may be formed of a synthetic resin material. However, the base body is desirably formed of the metal according to this mode (2), for assuring high mechanical strength.

(3) The assembly according to the above mode (2), wherein the above-indicated surface of the base body has been subjected to a surface treatment for increasing affinity or adhesiveness with respect to the thermoplastic resin of the enclosing member.

The base body formed of the metal and the enclosing member formed of the thermoplastic resin can be welded or bonded with high bonding strength where the welding surfaces of the base body and the enclosing member are made clean. Where the above-indicated surface of the base body has been subjected to the surface treatment for increasing affinity or adhesiveness with respect to the thermoplastic resin, the bonding strength with which the base body and the enclosing member are welded or bonded can be significantly increased, resulting in an improved reliability of the assembly.

(4) The assembly according to any one of the above modes (1) to (3), wherein the enclosing member has a container-like shape and is a cover which covers the at least one functional component, in a state in which the enclosing member is welded to the base body, such that bonded portions of the base body and the enclosing member are fluid-tightly bonded.

The enclosing member may be a member having a hollow surrounding portion which surrounds or encloses the functional component. Especially where the enclosing member has a container-like shape having a closing portion which closes one of opposite two openings of the surrounding portion and is a cover which covers the functional component and which is bonded or welded to the base body at the other opening such that bonded portions of the base body and the cover are fluid-tightly bonded, according to this mode (4), the effect of the present invention is advantageously obtained. This arrangement permits an interior space of the cover to be isolated, with high stability, from an exterior space of the cover in a simplified manner. The interior space of the cover may be filled with a gas such as air and nitrogen, or a liquid such as oil and water.

(5) The assembly according to any one of the above modes (1) to (4), wherein the at least one functional component includes at least one solenoid-operated valve of a hydraulic pressure control device for a hydraulically operated brake system for a vehicle, the base body having at least one fluid passage which is formed in the base body and which communicates with the at least one solenoid-operated valve.

Preferably, a solenoid-operated valve of the hydraulic pressure control device of the hydraulically operated brake system for the vehicle is enclosed in the interior space of the cover which is isolated from the exterior space of the cover, so that the solenoid-operated valve is waterproofed. If this mode (5) is employed, the requirement described above is satisfied at a reduced cost.

(6) The assembly according to the above mode (5), wherein the hydraulically operated brake system includes a brake cylinder for generating braking force to regulate rotation of a wheel of the vehicle, the base body being provided with, as the at least one functional component, a pressure-increasing valve for supplying a working fluid to increase pressure in the brake cylinder and a pressure-decreasing valve for permitting the working fluid from being discharged from the brake cylinder to decrease the pressure in the brake cylinder, the base body being further provided with at least one of a reservoir for storing the working fluid which is discharged from the brake cylinder and a pump for delivering the working fluid in the reservoir to the pressure-increasing valve.

For reducing the cost of manufacture, it is desirable that the working fluid accommodating room of the reservoir or the pump room for the hydraulic pump is provided by a recess formed in the base body. In other words, it is preferable from the standpoint of reduction in the manufacturing cost that the base body functions as a portion of a housing of the reservoir or the hydraulic pump. In this case, the reservoir or the pump is disposed on another side of the base body different from the side thereof on which the functional component is disposed.

(7) An assembly comprising a base body, a first member fixed to one surface of the base body, and a second member fixed to the first member, wherein the base body is formed of a laser non-transmitting material, a part of the first member located nearer to the base body is formed of a thermoplastic resin having laser transmitting property while a part of the first member located nearer to the second member is formed of a laser non-transmitting material, and the second member is formed of a thermoplastic resin having laser transmitting property, the first member and the second member being welded to the base body and the first member, respectively.

In producing the assembly according to this mode, the base body is irradiated with a laser beam transmitted through the part of the first member which is nearer to the base body (the base-body-side part of the first member) and which has laser transmitting property, so that heat is generated at a portion of the base body which is irradiated with the laser beam. The part of the first member which is nearer to the second member (the second-member-side part of the first member) and which is formed of the laser non-transmitting material is irradiated with the laser beam transmitted through the second member having laser transmitting property, so that heat is generated at a portion of the second-member-side part of the first member which is irradiated with the laser beam. Since the base-body-side part of the first member and the second member are formed of the thermoplastic resin, at least a portion of a contact portion of the base-body-side part of the first member which is in contact with the laser-irradiated, heated portion of the base body and a portion of a contact portion of the second member which is in contact with the laser-irradiated, heated portion of the second-member-side part of the first member are melted, so that the first member is welded or bonded to the base body and the second member is welded or bonded to the first member, respectively, at the respective contact portions.

According to the arrangement described above, in both of the welding operations of welding or bonding the first member to the base body and the second member to the first member, a direction of irradiation (incidence) of the laser beam can be made to have a component from the first and second members toward the base body. This arrangement eliminates, in both of the welding operations described above, a need of changing the posture of the pre-bonded assembly including the base body, the first member and the second member. For instance, the pre-bonded assembly need not be inverted during the welding operations. Further, it is not necessary, in the welding operations, to largely change a position of a laser beam emitting device used in the welding operations since the direction of irradiation of the laser beam to be emitted can be made to have the above-described component. Therefore, the present arrangement permits easy utilization of the single laser beam emitting device both in bonding the first member and the base body and in bonding the first member and the second member. Alternatively, the present arrangement permits the welding operation of the first member and the base body and the welding operation of the first member and the second member to be conducted at the same time by using a plurality of laser beam emitting devices.

The features described with respect to the above-indicated modes (1) through (6) may be applied to the assembly according to this mode (7).

(8) An assembly comprising a base body, a first member fixed to one surface of the base body, and a second member fixed to the first member, wherein the base body is formed of a laser non-transmitting material and the first and second members are formed of a thermoplastic resin having laser transmitting property, the first member being welded to the base body while the second member is welded to the first member with a layer of a laser non-transmitting material being interposed therebetween.

In producing the assembly according to the above-described mode (8), the base body formed of the laser non-transmitting material is irradiated with a laser beam transmitted through the first member having laser transmitting property, so that heat is generated at a portion of the base body irradiated with the laser beam. The layer of the laser non-transmitting material interposed between the first and second members is irradiated with a laser beam transmitted through the second member having laser transmitting property, so that heat is generated in the laser-irradiated layer. Since the first and second members are formed of the thermoplastic resin, portions of the first member and a portion of the second member are melted, so that the first member is welded or bonded to the base body and the second member is welded or bonded to the first member. The assembly according to this mode (8) enjoys the same advantages as those described with respect to the mode (7) indicated above.

The features described above with respect to the above-indicated modes (1) through (6) may be applied to the assembly according to this mode (8).

(9) A method of producing an assembly comprising a base body, at least one functional component which is provided on one side of the base body, and an enclosing member which is fixed to a surface of the base body located on the above-indicated one side of the base body, such that the enclosing member encloses the at least one functional component, wherein the base body is formed of a metal and the enclosing member is formed of a thermoplastic resin having laser transmitting property, the base body being irradiated with a laser beam transmitted through the enclosing member, so as to generate heat in the base body for thereby welding the enclosing member to the base body.

The explanations described above with respect to the above-indicated modes (1) and (2) are true of this mode (9). Further, the features described above with respect to the above-indicated modes (3) through (6) may be applied to the assembly according to this mode (9).

(10) A method of producing an assembly comprising a base body, a first member fixed to one surface of the base body, and a second member fixed to the first member, wherein the base body is formed of a laser non-transmitting material, a part of the first member located nearer to the base body is formed of a thermoplastic resin having laser transmitting property while a part of the first member located nearer to the second member is formed of a laser non-transmitting material, and the second member is formed of a thermoplastic resin having laser transmitting property, the base body being irradiated with a laser beam transmitted through the part of the first member located nearer to the base body for thereby welding the first member and the base body to each other while the part of the first member located nearer to the second member is irradiated with a laser beam transmitted through the second member for thereby welding the second member and the first member to each other.

The explanation described above with respect to the above-indicated mode (7) is true of this mode (10). Further, the features described above with respect to the above-indicated mode (2) through (6), for instance, may be applied to the producing method according to this mode (10), if the term "enclosing member" is replaced with the term "the first member".

(11) A method of producing an assembly comprising a base body, a first member fixed to one surface of the base body, and a second member fixed to the first member, wherein the base body is formed of a laser non-transmitting material and the first and second members are formed of a thermoplastic resin having laser transmitting property, the base body being irradiated with a laser beam transmitted through the first member for thereby welding the first member and the base body to each other while a layer of a laser non-transmitting material interposed between the first and second members is irradiated with a laser beam transmitted through the second member for thereby welding the first and second members to each other.

The explanation described above with respect to the above mode (8) is true of this mode (11). Further, the features described above with respect to the above-indicated modes (2) through (6), for instance, may be applied to the producing method according to this mode (11), if the term "enclosing member" is replaced with the term "the first member".

BEST MODE FOR CARRYING OUT THE INVENTION

The hydraulic pressure control device according to the present invention has a body assembly in which a plurality of functional components for increasing and decreasing the hydraulic pressure, and other components are disposed. Initially, there will be described briefly an anti-lock brake system for a motor vehicle which includes the hydraulic pressure control device. Then, there will be described in detail the body assembly of the hydraulic pressure control device.

Figure 1:
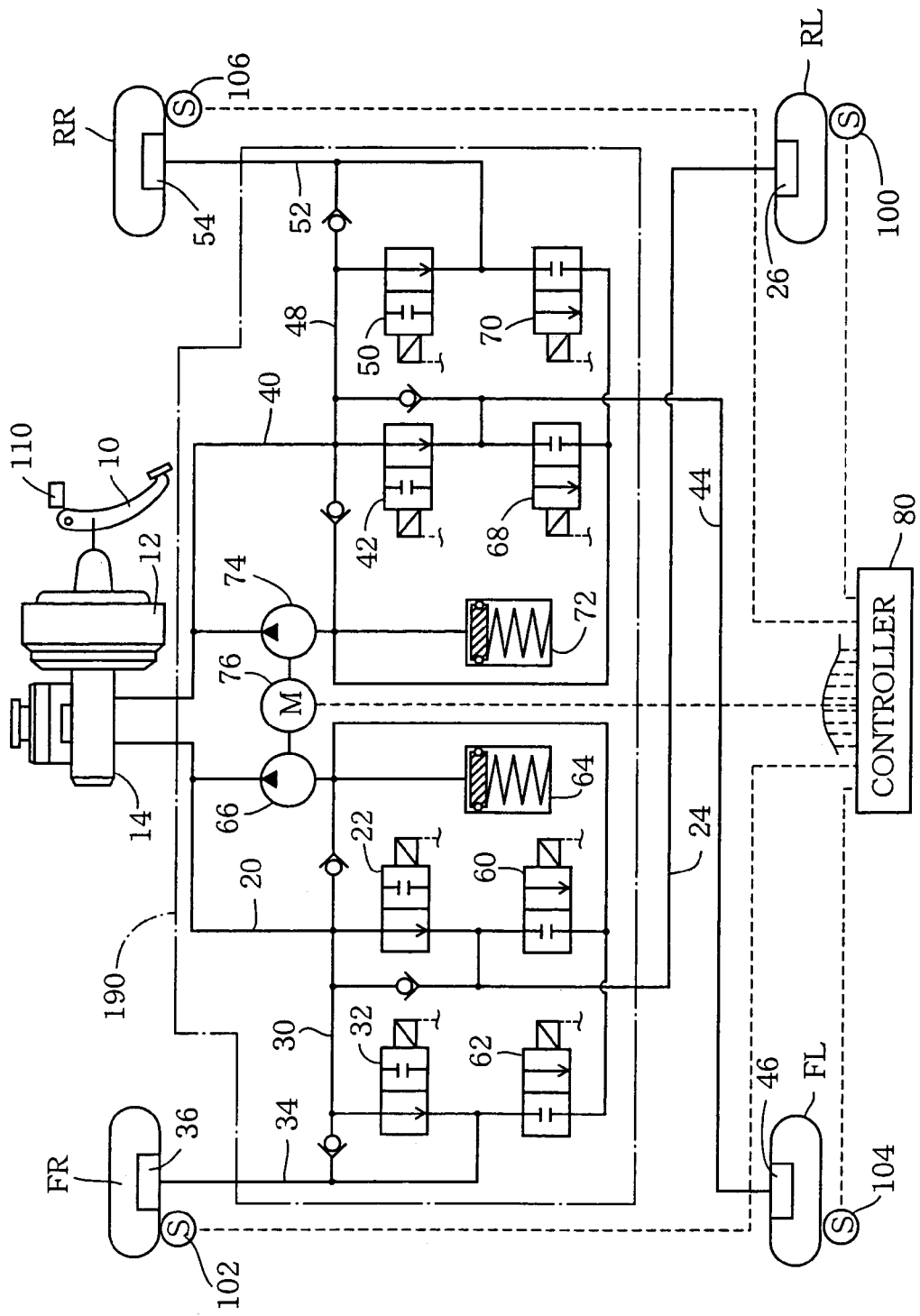
FIG. 1 is a view showing a circuit diagram of an anti-lock brake system which includes a hydraulic pressure control device according to the present invention.

In FIG. 1, the reference numeral 10 denotes a brake pedal connected to a master cylinder 14 through a booster 12. The master cylinder 14 is of a tandem type having two pressure chambers arranged in series in which equal brake pressures are generated.

The present brake system is of an X-piping type in which mutually independent two piping systems are arranged in an "X"-like form. In the first piping system, one of the pressure chambers of the master cylinder 14 is connected to a brake cylinder 26 for a brake of a rear left wheel RL through a fluid passage 20, a normally-open solenoid-operated valve 22 and a fluid passage 24, and also to a brake cylinder 36 for a brake of a front right wheel FR through the fluid passage 20, a fluid passage 30, a normally-open solenoid-operated valve 32 and a fluid passage 34. In the second piping system, the other pressure chamber of the master cylinder 14 is connected to a brake cylinder 46 for a brake of a front lent wheel FL through a fluid passage 40, a normally-open solenoid-operated valve 42 and a fluid passage 44, and also to a brake cylinder 54 for a brake of a rear right wheel RR through the fluid passage 40, a fluid passage 48, a normally-open solenoid-operated valve 50 and a fluid passage 52.

In the first piping system, the fluid passage 24 and the fluid passage 34 are connected to a reservoir 64 through a normally-closed solenoid-operated valve 60 and a normally-closed solenoid-operated valve 62, respectively. The reservoir 64 is connected to a suction inlet of a pump 66, while a delivery outlet of the pump 66 is connected to the fluid passage 20. In the second piping system, the fluid passage 44 and the fluid passage 52 are connected to a reservoir 72 through a normally-closed solenoid-operated valve 68 and a normally-closed solenoid-operated valve 70, respectively. The reservoir 72 is connected to a suction inlet of a pump 74, while a delivery outlet of the pump 74 is connected to the fluid passage 40. The two pumps 66, 74 are driven by a common drive motor 76.

In the present brake system described above, the brake pressure for the rear left wheel RL, for example, is increased when the solenoid-operated valves 22, 60 are both placed in the non-energized state, kept at a constant level when only the solenoid-operated valve 22 is placed in the energized state, and decreased when the valves 22, 60 are both placed in the energized state. The brake pressures for the other wheels are similarly controlled. That is, an appropriate one of the pressure-increase, pressure-hold and pressure-decrease states of the brake pressure for each wheel is selectively established depending upon the combination of the operating states of the appropriate two solenoid-operated valves. For simplification of the description, states of electric currents to be supplied to the solenoids of the respective valves for establishing the pressure-increase, pressure-hold and pressure-decrease states of the brake pressure, respectively, are hereinafter referred to as "a pressure-increase current supplying state", "a pressure-hold current supplying state" and "a pressure-decrease current supplying state", respectively.

A part of the present brake system for carrying out an anti-lock control is known in the art, and a description of which is briefly given. The present brake system includes a controller 80 which carries out processing of signals inputted through four wheel rotating speed sensors 100, 102, 104, 106 so as to monitor the rotating speeds of the four wheels. When a stop lamp switch 110 is turned on and depression of the brake pedal 10 is detected, it is judged for each of the four wheels whether a locking tendency is generated in the wheel. When the locking tendency is detected in one wheel, two valves for controlling the brake pressure of that wheel are placed in the pressure-decrease current supplying state, so that opening and closing of the valves are conducted to decrease the brake pressure of the brake cylinder for the wheel in question, for thereby canceling the locking tendency of that wheel. When it is judged that the locking tendency of the wheel is cancelled, the two valves are placed in the pressure-hold current supplying state after the pressure-decrease state of the brake pressure is released, so that the rotating speed of the wheel is continuously decreased while the brake pressure is kept in the pressure-hold state. If it is judged that the braking force is insufficient, the two valves are placed in the pressure-increase current supplying state, so that the brake pressure is gradually increased up to a level at which the braking force is optimum. The control indicated above is conducted during a time period in which the brake pedal 10 is depressed, so that the wheel is controlled such that the locking of the wheel does not occur while preventing reduction in the braking force by controlling the brake pressure to be selectively placed in one of the pressure-increase, pressure-hold and pressure-decrease states.

<Composite-casing Type Assembly>

Next, there will be explained the hydraulic pressure control device constructed according to the present invention and indicated at 190 in FIG. 1. The hydraulic pressure control device 190 is in the form of a unit in which there are arranged the functional components such as the solenoid-operated valves, the fluid passages, etc., (included in an area enclosed with one-dot chain line in FIG. 1). As shown in the schematic view of FIG. 2, the hydraulic pressure control device 190 has a body assembly 192 including a housing 200 as a base body, a casing 202 as an enclosing member or a first member, and a lid 204 as a second member. In the housing 200 formed of a metal such as steel or aluminum alloy, a plurality of fluid passages are formed and the functional components are disposed at suitable portions of the housing 200. The controller 80 is accommodated in an interior space defined by the housing 200, the casing 202 and the lid 204. In this respect, it may be considered that an integral body of the casing 202 and the lid 204 corresponds to the enclosing member.

Figure 2:
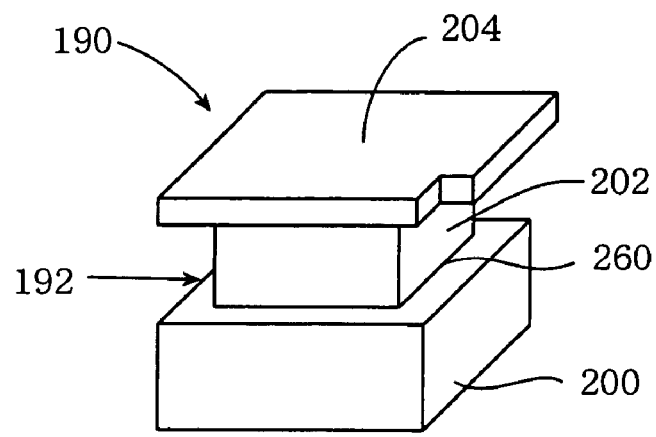
FIG. 2 is a view showing an appearance of the hydraulic pressure control device.
Figure 3:
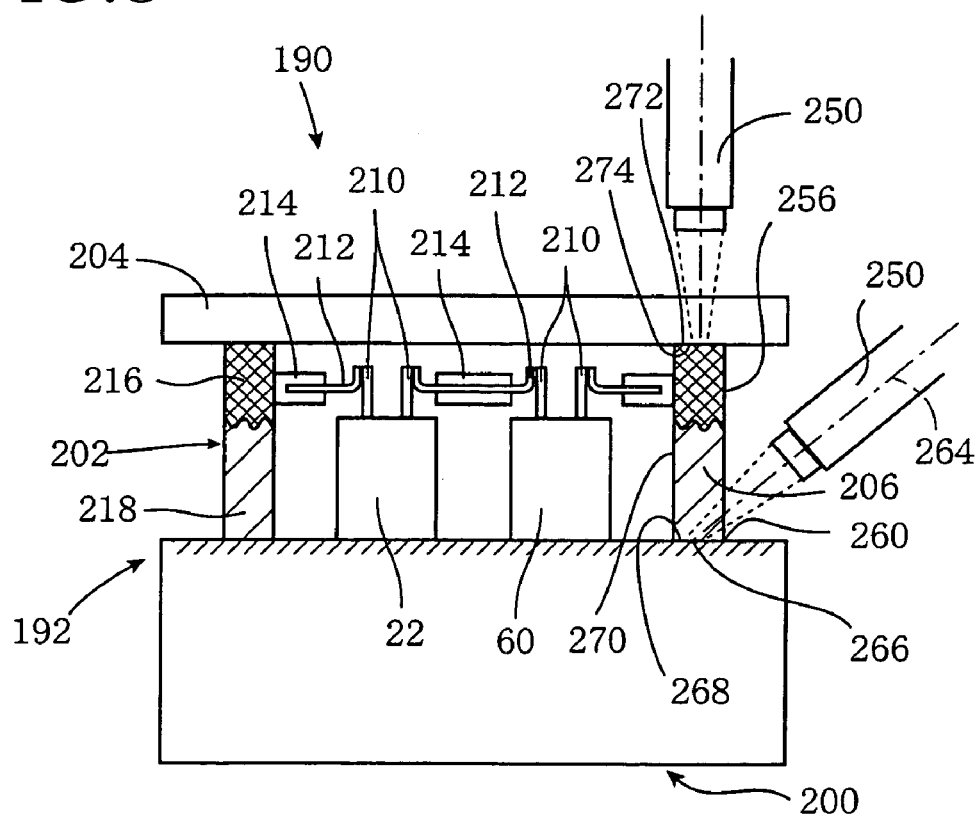
FIG. 3 is a front elevational view partly in cross section showing the hydraulic pressure control device.

FIG. 2 schematically shows the appearance of the hydraulic pressure control device 190. An upper surface of the housing 200 has been subjected to a surface treatment for increasing affinity or adhesiveness with respect to resin. To the upper surface of the housing 200, the casing 202 formed of a thermoplastic resin and having four walls 206 and two axially opposite openings is welded or bonded. To the casing 202, the lid 204 formed of a thermoplastic resin is welded or bonded so as to cover the entirety of one of the two openings (upper opening) of the casing 202 remote from the housing 200. A space located above the housing 200 is covered by a cover consisting of the casing 200 and the lid 204, so that the housing 200 and the cover are bonded to each other such that the bonded portions of the housing 200 and the cover are fluid-tightly bonded. In the description, while the upper side as seen in FIGS. 2 and 3 is referred to as the upper side of the hydraulic pressure control device 190, the device 190 is not necessarily be used in the posture as shown in FIGS. 2 and 3.

The solenoid-operated valves are installed on the housing 200 such that a valve portion of each valve is disposed within the housing 200 and a solenoid portion protrudes upwardly from the housing 200. In FIG. 3, two solenoid-operated valves 22, 60 are shown as representative examples. On the upper ends of the respective solenoid-operated valves 22, 60, there are provided terminals 210 connected to electromagnetic coils of the valves 22, 60. The terminals 210 are welded to connecting members 212. The terminals 210 of the solenoid-operated valves 22, 60 are connected to the controller 80 by the connecting members 212 that are fixed to inner surfaces of the walls of the casing 202.

The lid 204 is formed of a laser transmitting resin. In bonding or welding the lid 204 and the casing 202, a laser beam emitted from an upper side of the lid 204 is transmitted through the lid 204, so that the upper surface of the casing 202 is irradiated with the laser beam. The casing 202 includes an upper part 216 and a lower part 218 having mutually different laser transmitting characteristics. The casing 202 is produced by two-layer injection molding in which one of two resin materials which have mutually different laser transmitting properties is first injection-molded, and subsequently the other resin material is injection-molded. The upper part 216 of the casing 202 is formed of a laser absorbing resin and absorbs the laser beam incident thereon, so that heat is generated in the laser-irradiated portion of the upper part 216 and that portion is melted or fused. The heat generated in the laser-irradiated portion of the upper part 216 propagates to the lid 204, so that a portion of a contact portion of the lid 204 which is in contact with the laser-irradiated heated portion of the upper part 216 of the casing 202 is melted, whereby the lid 204 and the casing 202 are welded to each other. The lower part 218 of the casing 202 is formed of a laser transmitting resin. In bonding or welding the casing 202 and the housing 200, a laser beam incident obliquely with respect to the upper surface of the housing 200 is transmitted through the lower part 218 of the casing 202, so that the upper surface of the housing 200 located under the casing 202 is irradiated with the laser beam. Accordingly, heat is generated in the laser-irradiated upper surface of the housing 200, and the generated heat propagates to the lower part 218, so that a portion of a contact portion of the lower part 218 of the casing 202 which is in contact with the laser-irradiated, heated upper surface of the housing 200 is melted. Since the upper surface of the housing 200 has been subjected to the surface treatment for increasing affinity or adhesiveness with respect to the resin, the above-indicated contact portion of the lower part 218 which has been melted solidifies and is firmly fixed to the upper surface of the housing 200. Accordingly, the casing 202 and the housing 200 are welded or bonded to each other with sufficiently high bonding strength.

Figure 4:
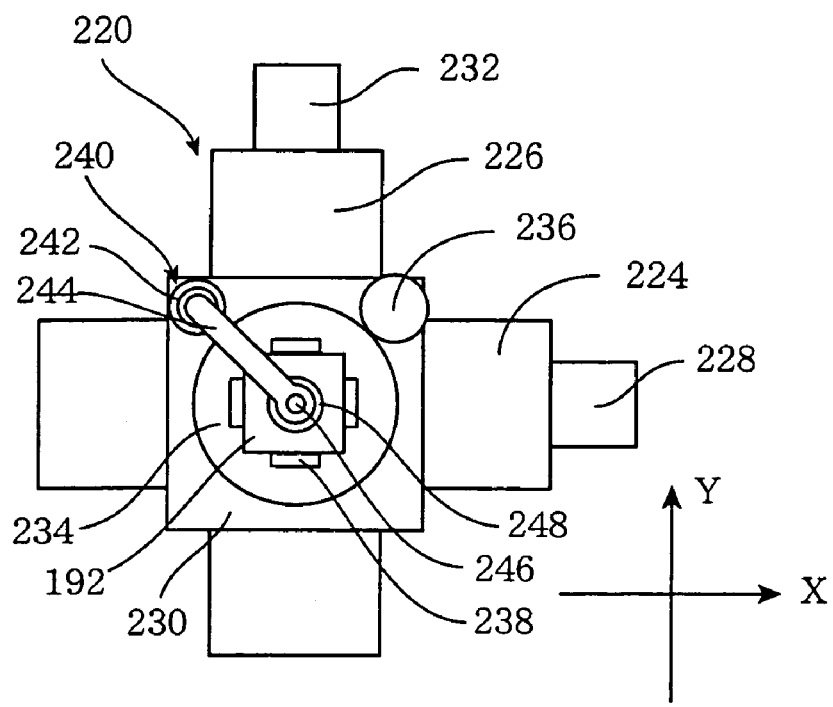
FIG. 4 is a plan view showing a work holding and moving apparatus used in producing the hydraulic pressure control device.

Referring next to FIG. 4, there will be described a work holding and moving apparatus 220 which includes a work holding device for holding the body assembly 192 of the hydraulic pressure control device 190 and a work moving device for moving and rotating the same 192. An X-axis table 226 provided on a guide 224 for the X-axis table 226 is moved in an X-axis direction by an X-axis-table moving device 228, and a Y-axis table 230 provided on the X-axis table 226 is moved in a Y-axis direction by a Y-axis-table moving device 232, whereby the Y-axis table 230 is moved in X-Y directions. The X-axis table 226, the guide 224, the X-axis-table moving device 228, the Y-axis table 230 and the Y-axis-table moving device 232 cooperate to constitute an X-Y directions moving device. A work table 234 provided on the Y-axis table 230 is rotated about an axis of the work table 234 by a work-table rotating device 236. The work table 234 and the work-table rotating device 236 cooperate to constitute a work rotating device. The X-Y directions moving device and the work rotating device cooperate to constitute the work moving device for moving and rotating the body assembly 192 of the hydraulic pressure control device 190. On the work table 234, there are provided four positioning protrusions 238 as one kind of a positioning device. The housing 200 is positioned with respect to the center of the work table 234 such that the housing 200 is surrounded by the four positioning protrusions 238. In place of the positioning protrusions 238, there may be provided, in the work table 234, a recess into which the housing 200 is fitted. Further, in place of the work table 234, there may be provided a chucking device by which the housing 200 is chucked and held.

On the Y-axis table 230, a work fixing device 240 is provided, and the upper surface of the lid 204 of the body assembly 192 of the hydraulic pressure control device 190 placed on the work table 234 is pressed downwardly by the work fixing device 240, so that the lid 204 and casing 202 are fixedly positioned with respect to the housing 200 without moving relative to the same 200. An arm drive device 242 of the work fixing device 240 is fixed on the Y-axis table. The arm drive device 242 permits an arm 244 extending toward the center of the work table 234 to be moved in a vertical direction and to be pivotable about a vertically extending axis of the arm drive device 242. The arm 244 is provided, at its leading end, a holding shaft 246 such that the holding shaft 246 is movable upwardly in a vertical direction and such that the holding shaft 246 is biased downwardly in the vertical direction by a compression coil spring. A rotating plate 248 is held by the holding shaft 246 via a bearing such that the rotating plate 248 is smoothly rotatable about an axis thereof The upper surface of the lid 204 of the body assembly 192 of the hydraulic pressure control device 190 is pressed downwardly by the rotating plate 248 with the rotating axes of the rotating plate 248 and the work table 234 being aligned with each other. When the body assembly 192 is rotated together with the work table 234, the rotating plate 248 is also rotated. The four positioning protrusions 238 as one kind of the positioning device and the work fixing device 240 cooperate to constitute the work holding device which positions the body assembly 192 with respect to the work table 234 and holds the body assembly 192 in position. It is preferable that the housing 200 and the casing 202 have mutually engaging portions at which the housing 200 and the casing 202 are held in engagement with each other, so that the housing 200 and the casing 202 are positioned relative to each other. Similarly, it is preferable that the casing 202 and the lid 204 have mutually engaging portions at which the casing 202 and the lid 204 are held in engagement with each other, so that the casing 202 and the lid 204 are positioned relative to each other. In the present arrangement, the body assembly 192 is held in a posture in which the lid 204, the casing 202 and the housing 200 are stacked in the vertical direction, such that the lid 204 is located at an uppermost position of the body assembly 192 and the housing 200 is located at a lowermost position, as shown in FIGS. 2 and 3. The body assembly 192 held in the posture described above is moved by the work moving device. The body assembly 192 is not necessarily held in the posture in which the lid 204 is located at the uppermost position thereof Where a work holding and moving device different from that explained above is used, the welding operations may be conducted on the body assembly 192 which is held in a posture in which the lid 204, the casing 202 and housing 200 are arranged in the transverse or horizontal direction. The welding operations may be conducted on the body assembly 192 which is held in a posture in which the body assembly 192 is inclined, or in a posture in which the lid 204 is located at the lowermost position of the body assembly 192.

The welding operations on the body assembly 192 are conducted in the following manners, for instance. The housing 200 in which various functional components are disposed is positioned, by the positioning protrusions 238, relative to the work table 234 of the work holding and moving apparatus shown in FIG. 4, such that the housing 200 is located at a central portion of the work table 234. On the housing 200 placed on the work holding and moving apparatus, the casing 202 and the lid 204 are placed in this order and pressed onto the housing 200 by the work fixing device 240. In this state, the plurality of connecting members 212 provided on the casing 202 via the supporting members 214 and the terminals 210 of the plurality of solenoid-operated valves 22, 60, etc., provided on the housing 200 are held in contact with each other (as shown in FIG. 3).

Initially, the welding operation for welding or bonding the casing 202 and the housing 200 will be explained. As shown in FIG. 3, a laser beam emitting device 250 is located outside the casing 202 such that the laser beam emitting device 250 emits the laser beam toward an intersecting line of an outer surface 256 of each wall 206 of the casing 202 and the upper surface of the housing 200. Described in detail, the laser beam emitting device 250 is disposed such that an optical axis 264 of the laser beam to be emitted is perpendicular to the intersecting line 260 and such that an angle defined by the optical axis of the laser beam and the upper surface of the housing 200 is 60 degrees, for instance. The position of the laser emitting device 250 and the direction of irradiation of the laser beam are adjusted as follows: The focus of the laser beam emitting device 250 is located on the upper surface of the housing 200. The irradiated area of the laser beam which is emitted from the laser beam emitting device 250 is a predetermined elliptical shape and the length of major axis of the elliptical area, i.e., spot of the laser beam, corresponds to 40–80% of the thickness of the wall 206 of the casing 202. The length of major axis of the spot of the laser beam is determined depending upon the strength required for bonding the casing 202 and the housing 200, the output of the laser beam emitting device 250, etc. Only a part of the welding surfaces of the casing 202 and the housing 200 at which the casing 202 and the housing 200 are welded together or the entirety of the welding surfaces may be welded, as desired.

Figure 5:
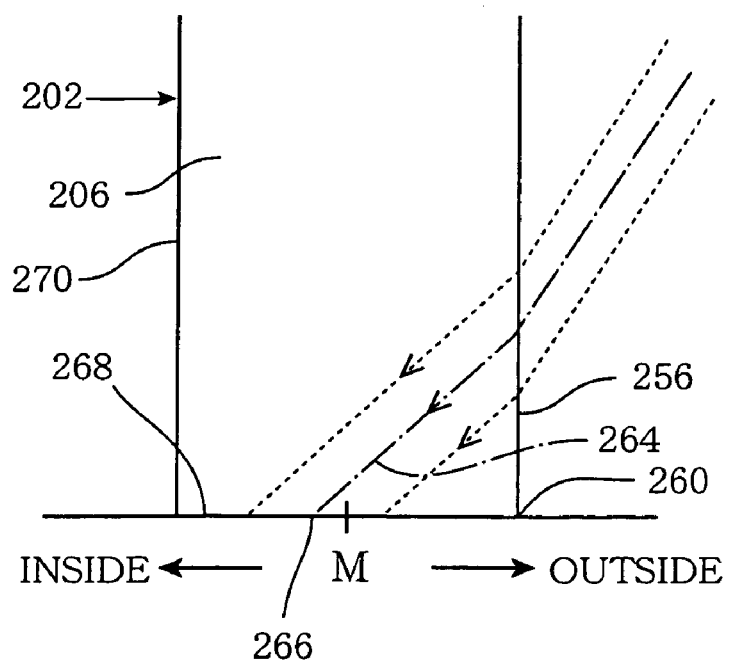
FIG. 5 is a schematic view showing different optical path lengths, at different positions of the casing, of the laser beam which is transmitted through the casing.

The lower part 218 of the casing 202 is formed of the laser transmitting resin. Since the laser transmitting resin has a some degree of laser absorbing property, the laser beam which is transmitted through the laser transmitting resin attenuates. In view of this, a position of an intersection 266 of the upper surface of the housing 200 and the optical axis 264 of the laser beam is determined to mitigate or reduce an influence of the attenuation of the laser beam caused by differences in the optical path length of the laser beam transmitted through the laser transmitting resin. FIG. 5 schematically shows the above-described contact portion 268 of the housing 200 and the laser beam. When the laser beam is incident on and enters the resin from the atmosphere, the laser beam is refracted at the outer surface 256 of the wall 206 of the casing 202 which is a boundary between the air and the resin. As shown in FIG. 5, the laser beam is emitted from the upper side of the housing 200 and is incident at an angle inclined with respect to the outer surface 256 of the wall 206 of the casing 202. Accordingly, the optical path length of the laser beam transmitted through the wall 206 is shorter at the right-hand side (as seen in FIGS. 3 and 5) of the wall 206 nearer to the outer surface 256 thereof, than at the left-hand side (as seen in FIGS. 3 and 5) of the wall 206 nearer to an inner surface 270 of the wall 206. Accordingly, the contact portion 268 of the upper surface of the housing 200 suffers from a variation in the amount of heat to be generated, at an outside part thereof corresponding to the right-hand side of the wall 206 and at an inside part thereof corresponding to the left-hand side of the wall 206. Namely, the amount of the generated heat is larger at the outside part of the contact portion 268 than at the inside part thereof. To mitigate or compensate for the influence of the variation of the amount of the heat generated on the contact portion 268 described above, the movement of the work holding and moving apparatus 220 is controlled, as needed, such that the intersection 266 of the optical axis 264 of the laser beam and the contact portion 268 is located at a position on the contact portion 268 which is nearer to the inner surface 270 of the wall 206 of the casing 202 than a widthwise middle position (indicated by "M" in FIG. 5) of the contact portion 268.

Since the lower part 218 of the casing 202 is formed of the laser transmitting resin, the laser beam is less likely to be absorbed in the lower part 218. Accordingly, most of the emitted laser beam is transmitted through the wall 206 of the casing 202 and reaches the contact portion 268 of the upper surface of the housing 200 (as shown in FIGS. 3 and 5), so that the laser beam is absorbed in the contact portion 268, whereby the laser-irradiated portion of the contact portion 268 corresponding to the spot of the laser beam and a portion located in the vicinity of the laser-irradiated portion are heated. Since the housing 200 is formed of the metal and a high degree of thermal conductivity, a substantial part of the generated heat is diffused toward a peripheral portion of the spot of the laser beam. Some part of the generated heat, however, propagates to the lower surface of the casing 202, so that the lower surface of the casing 202 is melted. The melted resin contacting the upper surface of the housing 200 is cooled as the spot of the laser beam moves at a constant speed, and solidifies on the upper surface of the housing 200. With the movement of the housing 200 and the casing 202 along the intersecting line 260 at the constant speed by the work holding and moving apparatus 220 while the housing 200 and the casing 202 are irradiated with the laser beam, the portions of the casing 202 and the housing 200 to be heated by the laser beam are moved at the constant speed, so that the portion of the casing 202 which is in a heated state is melted and the portion of the casing 202 which is in a melted state is then cooled and solidifies. The portion of the casing 202 to be heated and melted displaces with the movement of the spot of the laser beam. The relative movement of the work holding and moving apparatus 220 and the spot of the laser beam is conducted by controlling the X-axis-table moving device 228, the Y-axis-table moving device 232 and the worktable rotating device 236, according to predetermined control programs. When the spot of the laser beam has been moved along and throughout a closed line on the contact portion 268 of the upper surface of the housing 200, the welding operation for welding or bonding the casing 202 to the housing 200 is completed.

Next, the welding operation for welding or bonding the casing 202 and the lid 204 will be explained. The lid 204 is placed on the casing 202 welded to the housing 200 which is fixedly positioned on the work holding and moving apparatus 220, and is pressed onto the casing 202 by the work fixing device 240. The laser beam emitting device 250 is located above the lid 204 such that the laser beam is emitted in a downward direction and such that the laser beam is incident on a widthwise middle portion of a contact portion 272 of an upper surface of each wall 206 of the casing 202 which is in contact with a contact portion 274 of the lower surface of the lid 202 and at which the casing 202 is welded to the lid 204. The distance between the laser beam emitting device 250 and the contact portion 272 and the focal length of the laser beam are adjusted by moving the laser beam emitting device 250, such that the diameter of the spot of the laser beam is equal to a value determined for the upper surface of the wall 206 (e.g., 40% to 80% of the thickness of the wall 206). When the laser beam is emitted from the device 250 toward the contact portion 272, the laser beam is transmitted or penetrates through the lid 204 formed of the laser transmitting resin, and reaches the contact portion 272 formed of the laser non-transmitting resin. The laser beam is absorbed in the laser-irradiated portion of the contact portion 272, and the laser-irradiated portion and a peripheral portion located in the vicinity of the laser-irradiated portion are heated. The generated heat propagates to the lid 204, so that a portion of the contact portion 272 of the casing 202 and a portion of the contact portion 274 of the lid 204 are melted, and the melted resins are mixed together. As the spot of the laser beam is moved at a constant speed along the longitudinal direction of the contact portion 272, the temperature of the melted resins is lowered, so that the melted resins solidify. When the spot of the laser beam has been moved along and throughout a closed line on the contact portion 272, the welding operation for welding the lid 204 and the casing 202 is completed. Thereafter, the work fixing device 240 is retracted from the lid 204, and the terminals 210 and the connecting members 214 are laser-welded. The welding operation for welding the terminals 210 and the connecting members 214 is not directly relevant to the principle of the present invention, and a detailed explanation of which is dispensed with. It is, however, noted that the laser beam emitted from the upper side of the lid 204 in the downward direction is transmitted through the lid 204 and reaches welding portions at which the terminals 210 and the connecting members 214 are welded together, without being substantially attenuated, since the lid 204 is formed of the laser transmitting resin.

<Absorbing-layer Intervening Type Assembly>

Figure 6:
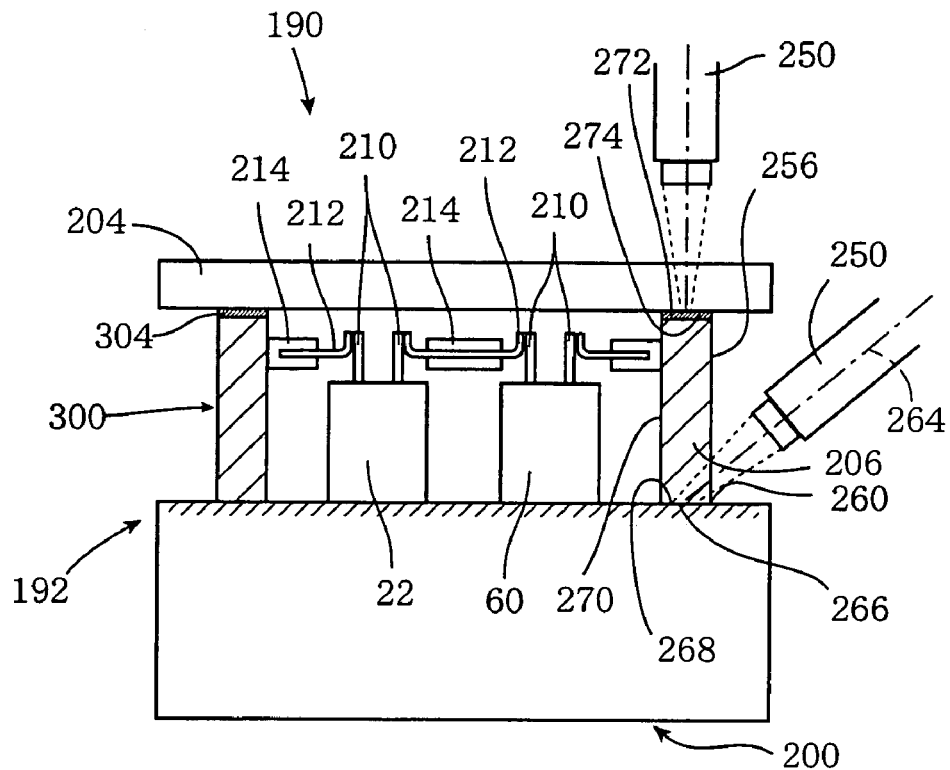
FIG. 6 is a front elevational view partly in cross section showing another hydraulic pressure control device according to the present invention.

Referring next to FIG. 6, there will be described an absorbing-layer intervening type assembly constructed also according to the present invention. The structure of this assembly including the housing 200 and the functional components is identical with that of the composite-casing type assembly described above, except that this assembly has a casing 300 the entirety of which is formed of a laser transmitting resin and except that the lid 204 and the casing 300 are welded or bonded to each other with a laser absorbing resin film 304 having a shape identical with a transverse cross sectional shape of the casing 300 being interposed between the lid 204 and the casing 300, so that the film 304 functions as a laser absorbing layer. The lid 204 is placed on the casing 300 via the laser absorbing resin film 304 and is pressed downwardly by the work fixing device 240. The thickness of the laser absorbing resin film 304 is preferably held in a range from 0.1 mm to 1 mm, more preferably in a range from 0.3 mm to 0.7 mm. The laser beam absorptivity of the laser absorbing resin film 304 is preferably not less than 40%, more preferably not less than 60%, most preferably 80% or more where the film 304 has a thickness of 1 mm.

The welding operation for welding or bonding the housing 200 and the casing 300 is the same as that conducted in the composite-casing type assembly described above, and a detailed explanation of which is dispensed with. The welding operation for welding or bonding the lid 204 and the casing 300 will be explained. In a manner similar to that described above, the laser beam is emitted from the laser beam emitting device 250 located right above the contact portion 272 of the upper surface of the casing 300. The laser beam is transmitted through the lid 204 formed of the laser transmitting resin and reaches the laser absorbing resin film 304. A portion of the laser absorbing resin film 304 corresponding to the spot of the laser beam and a portion of the film 304 in the vicinity of the spot of the laser beam are heated and melted, and respective portions of the contact portion 272 of the casing 300 and the contact portion 274 of the lid 204, which portions are in contact with the heated portion of the film 304, are melted to some extent. The melted resins of the lid 204, the casing 300 and the film 304 are mixed together. As the spot of the laser beam moves, the temperature of the melted resins is lowered, and accordingly the melted resins solidify. Since the explanation with respect to the assembly of FIG. 6 other than the described above is similar to that described above with respect to the composite-casing type assembly, further explanation is not given.

<Lid-casing Integral Type Assembly>

Figure 7:
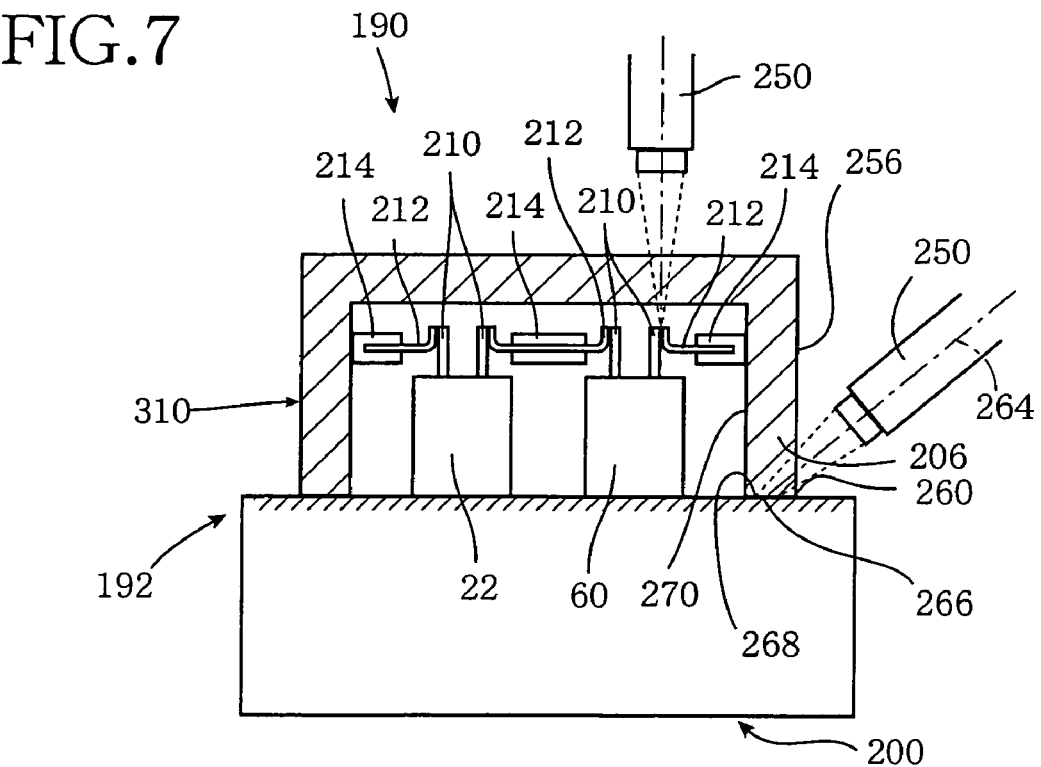
FIG. 7 is a front elevational view partly in cross section showing still another hydraulic pressure control device according to the present invention.

Referring next to FIG. 7, there will be described a lid-casing integral type assembly also constructed according to the present invention. The structure of this assembly including the housing 200 and the functional components is identical with that of the composite-casing type assembly described above, except that, in this assembly, a cover 310 in which a lid and a casing are provided as an integral member and which is formed of a laser transmitting resin is welded or bonded to the housing 200. The cover 310 is placed on the housing 200 and is pressed against the same 200 by the work fixing device 240. A manner in which the housing 200 and the cover 310 are welded or bonded to each other by using the laser beam emitting device 250 is the same as that described above with respect to the composite-casing type assembly, a detailed explanation of which is dispensed with. After the cover 310 has been bonded to the housing 200, the work fixing device 240 is retracted from the cover 310, and the terminals 210 and the connecting members 212 are welded together by the laser beam. In this case, the laser beam is emitted from the emitting device 250 located above the cover 310, in a vertically downward direction toward the cover 310. Since the cover 310 is formed of the laser transmitting resin, the laser beam is less likely to attenuate in the cover 310, whereby the laser beam is transmitted through the cover 310 and reaches portions of the terminals 210 and the connecting members 212 at which they are welded together.

<Welding Conditions, Materials, etc.>

The welding conditions, materials, etc., employed in the three assemblies described above are as follows.

The laser beam which is used in welding the casing 202, 300 and the housing 200, the cover 310 and the housing 200, and the casing 202, 300 and the lid 204 is, for example, a semiconductor laser or YAG-neodymium laser. The laser irradiation conditions are determined, for instance, depending upon materials of the objects to which the laser beam is applied for welding, desired strength with which the objects are welded together, transmissivity of the laser transmitting resin, optical path length of the laser in the laser transmitting resin, and other factors. In the assemblies described above, the semiconductor laser whose wavelength is held in a range from 800 nm to 940 nm was used. In welding the lid 204 and the casing 202, 300, for instance, the output of the laser beam was 200 W and the speed of movement of the laser beam was 4 m/min. In welding the casing 202, 300 or the cover 310 and the housing 200, for instance, the output of the laser beam was 500 W and the speed of movement of the laser beam was 4 m/min.

The angle of incidence of the laser beam upon welding the case 202 and the housing 200, for instance, with respect to the lower surface of the casing 202 is preferably made smaller than a total reflection angle, more preferably close to 0 degree. If it is assumed that a ratio of the refractive index of resin with respect to the laser beam, to the refractive index of air with respect to the laser beam (the refractive index of resin/the refractive index of air) is 1.3, the total reflection angle is about 50 degrees in a case where the laser beam enters, from the inside of the resin, a boundary surface between the resin and the air. Accordingly, under the assumption described above, it is preferable that an angle defined by the laser beam and the lower surface of the casing 202 in the inside of the resin is larger than about 40 degrees. Similarly, in welding or bonding the lid 204 and the casing 202, for instance, the angle of incidence of the laser beam with respect to the lower surface of the lid 204 is preferably made smaller than the total reflection angle, more preferably close to 0 degree.

The laser transmitting resin (or simply referred to as transmitting resin) of the lid 204, the lower part 218 of the casing 202, the casing 300, and the cover 310, for instance, is preferably a thermoplastic resin which has a high degree of laser beam transmitting property and which is selected, for instance, from among polybutylene terephthalate (hereinafter referred to as PBT), polyethylene terephthalate (hereinafter referred to as PET), and polyamide. Thermoplastic resins other than those described above may be employed. Further, there may be employed thermoplastic resins to which a reinforcing fiber such as a glass fiber or a carbon fiber, a filler such as inorganic powder, or a coloring agent is added. The laser transmitting resin preferably has transmissivity of not less than 10%, more preferably not less than 15%, and most preferably 20% or larger as measured when the laser beam reaches the welding surfaces. In the assemblies described above, the PBT as the thermoplastic resin to which 30% of the glass fiber is added was used as the laser transmitting resin.

As the laser absorbing resin (or simply referred to as absorbing resin) of the upper part 216 of the casing 202, for instance, it is preferable to employ the above-described laser transmitting resin to which carbon black or a coloring agent such as dye or pigment is added, so as to increase the absorptitivy of the laser beam. Further, the reinforcing fiber such as glass fiber or carbon fiber, and the filler such as the inorganic powder may be further added. In the assemblies described above, the PBT to which 30% of the glass fiber and the carbon black are added was used as the laser absorbing resin. The laser absorbing resin preferably has absorptivity of not less than 30%, more preferably not less than 50%, and most preferably 70% or larger where the thickness of the laser absorbing layer is 1 mm. While the laser absorbing resin film 304 is preferably a resin which is the same kind as the laser absorbing resin described above, the amount and kind of the materials may be altered or a laser absorbing resin of different kind may be employed, as long as the lid 204 and the casing 202 can be welded or bonded to each other via the film 304.

In the assemblies described above, the housing 200 is formed of aluminum alloy, and at least the contact portion 268 of the upper surface thereof has been subjected preferably to an electrochemical treatment such as plating by using triazine compound such as triazine thiol derivative. Alternatively, the housing 200 may be formed of stainless steel or nickel-plated steel, and at least the contact portion 268 of the upper surface thereof is subjected preferably to the above-described electrochemical treatment using triazine compound such as triazine thiol derivative. Further, the housing 200 may be formed of aluminum alloy, and at least the contact portion 268 of the upper surface thereof is subjected preferably to a chromate treatment, a treatment using chromium phosphate, or a treatment using zinc phosphate. Moreover, the housing 200 may be formed of steel, and at least the contact portion 268 of the upper surface thereof is subjected preferably to a treatment using zinc phosphate or a treatment using calcium zinc phosphate. Where the housing 200 is formed of the aluminum alloy or the stainless steel, and at least the contact portion 268 of the upper surface thereof is subjected to a surface treatment by using a silane coupling agent such as γ-glycide oxypropyl trimethoxy silane, the housing 200 exhibits improved water resistance. Such a housing 200 may be preferably used in the present invention.

<Other Assemblies>

Figure 8:
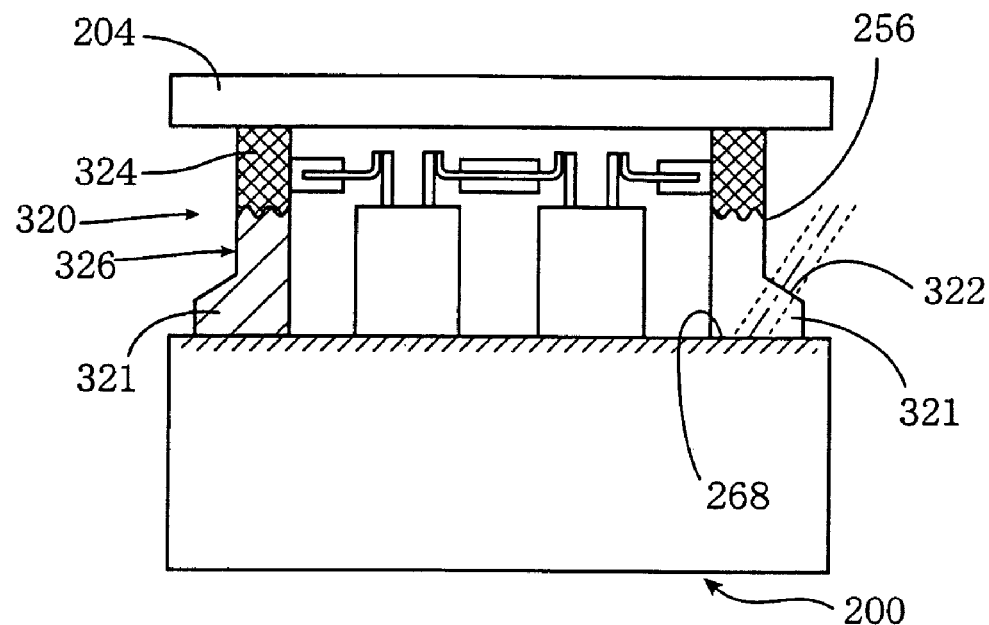
FIG. 8 is a front elevational view partly in cross section showing yet another hydraulic pressure control device according to the present invention.

Referring next to FIG. 8, there is shown another assembly the structure of which is identical with that of the assembly of FIG. 3, except that the assembly of FIG. 8 has a casing 320 which differs from the casing 202 of FIG. 3 in that a flange 321 is formed on a lower part 326 such that the flange 321 protrudes outwardly from the outer surface of the lower part 326. Owing to the provision of the flange 321, the angle defined by the laser beam and the contact portion 268 of the upper surface of the housing 200 can be made large. The thermoplastic resin used in the present invention has refractive index larger than that of the air, and the angle defined by the incident beam transmitted through the resin and the contact portion 268 is made smaller as shown in FIG. 5, due to refraction, than the angle defined by the incident beam and the contact portion 268 when the incident beam irradiates the contact portion 268 where the beam is not transmitted through the resin. If the flange 321 is provided with an incident surface 322 on which the laser beam is incident and which is constituted by an inclined plane which is inclined with respect to the vertical plane of the outer surface 256 of the wall 206 of the casing, the incident beam is not refracted at the incident surface 322 or the angle of refraction of the beam at the incident surface 322 can be made small. Further, depending upon the angle of incidence of the laser beam or the inclination angle of the incident surface 322 (while the incident surface 322 may be horizontal), the angle defined by the incident beam transmitted through the resin and the contact portion 268 of the upper surface of the housing 200 can be made larger than the angle defined by the incident beam and the contact portion 268 when the incident beam irradiates the contact portion 268 where the beam is not transmitted through the resin.

The casing 320 and the housing 200 are held in position such that the lower surface of the casing 320 and the contact portion 268 of the upper surface of the housing 200 are held in pressing contact with each other. In a microscopic viewpoint, however, the lower surface of the casing 320 and the contact portion 268 of the upper surface of the housing 200 are not completely smooth, but have minute unevenness or irregularity. Accordingly, between the interface of the respective surfaces, there exist portions where the surfaces are held in close contact and portions where space is formed in which the air exists. If it is assumed that a ratio of the refractive index of the resin with respect to the laser beam, to the refractive index of the air with respect to the laser beam is 1.3, the total reflection angle upon transmission of the beam from the inside of the resin into the atmosphere is about 50 degrees (while the angle defined by the beam and the contact portion 268 is about 40 degrees). Theoretically, if the incident angle is larger than the total reflection angle, the incident beam is totally reflected. If the incident angle is larger than the total reflection angle (while the angle defined by the beam and the contact portion 268 is smaller than about 40 degrees), there is caused energy loss of the laser beam, due to the total reflection, at the above-described portions where the respective surfaces of the lower surface of the casing 320 and the contact portion 268 of the housing 200 are not held in close contact. Although it is considered that the influence due to the total reflection decreases as the melted resins fill the space between the lower surface of the casing 320 and the contact portion 268 of the housing 200, the housing 200 can be heated with improved efficiency if the incident angle is made smaller than the total reflection angle. It is effective to make the incident angle smaller than the total reflection angle particularly where the degree of unevenness of the lower surface of the casing 320 and the contact portion 268 of the upper surface of the housing 200 is relatively large and accordingly the surfaces are not in contact with each other at many local portions thereof, or where it is desired to increase the heating efficiency without considerably increasing the output of the laser beam emitting device 250.

Figure 9:
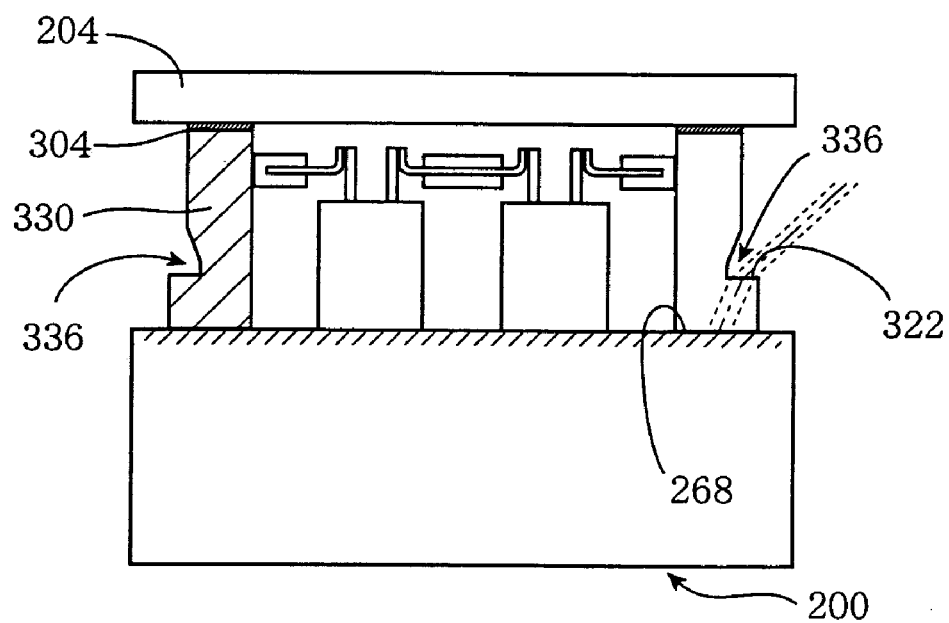
FIG. 9 is a front elevational view partly in cross section showing a further hydraulic pressure control device according to the present invention.

The inclination angle of the incident surface 322 with respect to the vertical plane of the outer surface 256 of the wall 206 is suitably determined depending upon the location to be irradiated with the laser beam, the irradiation angle with respect to the contact portion 268 of the upper surface of the housing 200, etc. The width dimension of the incident surface 322 is preferably determined by taking into account the diameter of the laser beam. In place of providing the incident surface 322 by forming the flange 321, a recess 336 may be formed in a casing 330 as shown in an assembly of FIG. 9 which is constructed also according to the present invention. The incident surface 322 is not limited to the flat surface, but may be a curved surface. The casing 330 of FIG. 9 corresponds to the casing 300 described above. The entirety of the casing 330 is formed of the laser transmitting resin. The casing 330 and the lid 204 are welded or bonded to each other with the laser absorbing resin film 304 being interposed therebetween.

The provision of the incident surface 322 constituted by the flat or curved plane, by forming the protrusion such as the flange 321 or the recess 336 described above may be applicable to all of the casing, the cover, and the lid constructed as described above. Depending upon the structure and configuration of the assembly to be produced, the incident surface 322 as one kind of a beam-introducing portion for adjusting the traveling direction of the beam is suitably provided, so that the degree of freedom in determining the irradiation location and irradiation angle of the laser beam is increased, permitting the laser welding or bonding to be carried out on the assemblies having various structures and configurations.

The provision of the flange 321 formed as described above is effective to increase an area (i.e., weld area) of the lower surface of the casing 320 at which the casing 320 is bonded to the upper surface of the housing 200. The increase in the weld area assures a high bonding strength with which the casing 320 and the housing 200 are bonded to each other. The casing 320 of the assembly of FIG. 8 corresponds to the casing 202 described above and has an upper part 324 formed of the laser absorbing resin and a lower part 326 formed of the laser transmitting resin. From the standpoint of increasing the weld area, the casing 202, 300, etc., may be provided, at a portion thereof to be bonded to the lid 204, a flange similar to the flange 321 or an inward flange which is formed on the inner surface of the wall of the casing. Further, the cover 310 may be provided with a flange similar to the flange 321 at a portion thereof to be bonded to the housing 200. In those arrangements, the welding operations may be carried out in a manner similar to that described above. Where the area of the spot of the single laser beam is insufficient to bond the lid 204 or the housing 200 and the casing, the welding operations may be conducted two times by changing the irradiation angle or irradiation location.

In the assemblies described above, the casing 202, 300 and the cover 310 have a quadangular shape in the transverse cross section. The casing and the cover may have a quadangular shape in the transverse cross section whose four corners are chamfered or any other shape such as a circular shape. Further, the casing and the cover may have a transverse cross sectional shape in which portions of the casing and the cover are made hollow or concaved inwardly, or protrude or expand outwardly. The casing and the cover may have any transverse cross sectional shape, provided that the laser beam reaches, in a state in which the laser beam keeps effective amount of energy, the contact portion 268 of the upper surface of the housing 200 which contacts the lower surface of the casing 202, etc. Further, the wall 206 of the casing may not be perpendicular to the upper surface of the housing 200. Although the laser beam is incident on the outer surface of each wall of the casing in producing the assemblies described above, the laser beam may be incident on the inner surface of the wall of the casing if the interior space within the casing has room that permits the incidence of the laser beam on the inner surface of the wall of the casing. The lid 204 is not limited to the simple planar shape, but may be any other shape such as a dish-like shape. Where the lid 204 has various other shapes described above, it is possible to provide the lid with the flange.

In the welding operations for welding or bonding the housing 200 and the casing 202, etc., and welding the lid 204 and the casing 202 etc., of the three assemblies described above, the body assembly 192 of the hydraulic pressure control device 190 is moved relative to the laser beam emitting device 250. The laser beam emitting device 250 may be moved relative to the body assembly 192 or both of the body assembly 192 and the laser emitting device 250 may be moved relative to each other. In these cases, the movement includes at least one of transfer (or transit or shift) and rotation. In other words, the welding operations my be conducted by using a device which permits at least one of the transfer and the rotation of the body assembly 192 and the emitting device 250 relative to each other in a third dimensional space.

While the preferred embodiments of the present invention have been described in detail for illustrative purpose only, it is to be understood that the present invention may be embodied with various changes, such as those described in DISCLOSURE OF THE INVENTION, that may occur to those skilled in the art.

The invention claimed is:

1. An assembly comprising a base body, a first member fixed to one surface of the base body, and a second member fixed to the first member, wherein
the base body is formed of a laser non-transmitting material, a part of the first member located nearer to the base body is formed of a thermoplastic resin having laser transmitting property while a part of the first member located nearer to the second member is formed of a laser non-transmitting material, and the second member is formed of a thermoplastic resin having laser transmitting property, the first member and the second member being welded to the base body and the first member, respectively.

2. The assembly according to claim 1, wherein the first member is a hollow member that is fixed at one of opposite open ends thereof to the base body and the second member is a lid member that is fixed onto the first member so as to close the other of the opposite open ends of the first member.

3. The assembly according to claim 2, wherein at least one functional component is provided on one side of the base body, and the first member and the second member constitute a cover that fluid-tightly covers said at least one functional component.

4. The assembly according to claim 3, wherein said at least one functional component includes at least one solenoid-operated valve of a hydraulic pressure control device for a hydraulically operated brake system for a vehicle, the base body having at least one fluid passage which is formed in the base body and which communicates with said at least one solenoid-operated valve.

5. The assembly according to claim 4, wherein the hydraulically operated brake system includes a brake cylinder for generating braking force to regulate rotation of a wheel of the vehicle, the base body being provided with, as said at least one functional component, a pressure-increasing valve for supplying a working fluid to increase pressure in the brake cylinder and a pressure-decreasing valve for permitting the working fluid from being discharged from the brake cylinder to decrease the pressure in the brake cylinder, the base body being further provided with at least one of a reservoir for storing the working fluid which is discharged from the brake cylinder and a pump for delivering the working fluid in the reservoir to the pressure-increasing valve.

6. The assembly according to claim 1, wherein the base body is formed of a metal.

7. The assembly according to claim 6, wherein the surface of the base body has been subjected to a surface treatment for increasing affinity or adhesiveness with respect to the thermoplastic resin of the first member.

8. An assembly comprising a base body, a first member fixed to one surface of the base body, and a second member fixed to the first member, wherein
the base body is formed of a laser non-transmitting material and the first and second members are formed of a thermoplastic resin having laser transmitting property, the first member being welded to the base body while the second member is welded to the first member with a layer of a laser non-transmitting material being interposed therebetween.

9. The assembly according to claim 8, wherein the first member is a hollow member that is fixed at one of opposite open ends thereof to the base body and the second member is a lid member that is fixed onto the first member so as to close the other of the opposite open ends of the first member.

10. The assembly according to claim 9, wherein at least one functional component is provided on one side of the base body, and the first member and the second member constitute a cover that fluid-tightly covers said at least one functional component.

11. The assembly according to claim 10, wherein said at least one functional component includes at least one solenoid-operated valve of a hydraulic pressure control device for a hydraulically operated brake system for a vehicle, the base body having at least one fluid passage which is formed in the base body and which communicates with said at least one solenoid-operated valve.

12. The assembly according to claim 11, wherein the hydraulically operated brake system includes a brake cylinder for generating braking force to regulate rotation of a wheel of the vehicle, the base body being provided with, as said at least one functional component, a pressure-increasing valve for supplying a working fluid to increase pressure in the brake cylinder and a pressure-decreasing valve for permitting the working fluid from being discharged from the brake cylinder to decrease the pressure in the brake cylinder, the base body being further provided with at least one of a reservoir for storing the working fluid which is discharged from the brake cylinder and a pump for delivering the working fluid in the reservoir to the pressure-increasing valve.

13. The assembly according to claim 8, wherein the base body is formed of a metal.

14. The assembly according to claim 13, wherein the surface of the base body has been subjected to a surface treatment for increasing affinity or adhesiveness with respect to the thermoplastic resin of the first member.

15. A method of producing an assembly comprising a base body, a first member fixed to one surface of the base body, and a second member fixed to the first member, wherein the base body is formed of a laser non-transmitting material, a part of the first member located nearer to the base body is formed of a thermoplastic resin having laser transmitting property while a part of the first member located nearer to the second member is formed of a laser non-transmitting material, and the second member is formed of a thermoplastic resin having laser transmitting property, the base body being irradiated with a laser beam transmitted through the part of the first member located nearer to the base body for thereby welding the first member and the base body to each other while the part of the first member located nearer to the second member is irradiated with a laser beam transmitted through the second member for thereby welding the second member and the first member to each other.

16. The assembly according to claim 15, wherein the first member is a hollow member that is fixed at one of opposite open ends thereof to the base body and the second member is a lid member that is fixed onto the first member so as to close the other of the opposite open ends of the first member.

17. The assembly according to claim 16, wherein at least one functional component is provided on one side of the base body, and the first member and the second member constitute a cover that fluid-tightly covers said at least one functional component.

18. The assembly according to claim 17, wherein said at least one functional component includes at least one solenoid-operated valve of a hydraulic pressure control device for a hydraulically operated brake system for a vehicle, the base body having at least one fluid passage which is formed in the base body and which communicates with said at least one solenoid-operated valve.

19. The assembly according to claim 18, wherein the hydraulically operated brake system includes a brake cylinder for generating braking force to regulate rotation of a wheel of the vehicle, the base body being provided with, as said at least one functional component, a pressure-increasing valve for supplying a working fluid to increase pressure in the brake cylinder and a pressure-decreasing valve for permitting the working fluid from being discharged from the brake cylinder to decrease the pressure in the brake cylinder, the base body being further provided with at least one of a reservoir for storing the working fluid which is discharged from the brake cylinder and a pump for delivering the working fluid in the reservoir to the pressure-increasing valve.

20. The assembly according to claim 15, wherein the base body is formed of a metal.

21. The assembly according to claim 20, wherein the surface of the base body has been subjected to a surface treatment for increasing affinity or adhesiveness with respect to the thermoplastic resin of the first member.

22. A method of producing an assembly comprising a base body, a first member fixed to one surface of the base body, and a second member fixed to the first member, wherein the base body is formed of a laser non-transmitting material and the first and second members are formed of a thermoplastic resin having laser transmitting property, the base body being irradiated with a laser beam transmitted through the first member for thereby welding the first member and the base body to each other while a layer of a laser non-transmitting material interposed between the first and second members is irradiated with a laser beam transmitted through the second member for thereby welding the first and second members to each other.

23. The assembly according to claim 22, wherein the first member is a hollow member that is fixed at one of opposite open ends thereof to the base body and the second member is a lid member that is fixed onto the first member so as to close the other of the opposite open ends of the first member.

24. The assembly according to claim 23, wherein at least one functional component is provided on one side of the base body, and the first member and the second member constitute a cover that fluid-tightly covers said at least one functional component.

25. The assembly according to claim 24, wherein said at least one functional component includes at least one solenoid-operated valve of a hydraulic pressure control device for a hydraulically operated brake system for a vehicle, the base body having at least one fluid passage which is formed in the base body and which communicates with said at least one solenoid-operated valve.

26. The assembly according to claim 25, wherein the hydraulically operated brake system includes a brake cylinder for generating braking force to regulate rotation of a wheel of the vehicle, the base body being provided with, as said at least one functional component, a pressure-increasing valve for supplying a working fluid to increase pressure in the brake cylinder and a pressure-decreasing valve for permitting the working fluid from being discharged from the brake cylinder to decrease the pressure in the brake cylinder, the base body being further provided with at least one of a reservoir for storing the working fluid which is discharged from the brake cylinder and a pump for delivering the working fluid in the reservoir to the pressure-increasing valve.

27. The assembly according to claim 22, wherein the base body is formed of a metal.

28. The assembly according to claim 27, wherein the surface of the base body has been subjected to a surface treatment for increasing affinity or adhesiveness with respect to the thermoplastic resin of the first member.

* * * * *